United States Patent
Bahnub et al.

(10) Patent No.: US 11,257,053 B2
(45) Date of Patent: Feb. 22, 2022

(54) PERSON TO BUSINESS PAYMENT SYSTEM AND METHOD

(71) Applicant: JPMorgan Chase Bank, N.A., New York, NY (US)

(72) Inventors: Brent J. Bahnub, Dublin, OH (US); Howard Spector, Woolwich, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 751 days.

(21) Appl. No.: 15/885,246

(22) Filed: Jan. 31, 2018

(65) Prior Publication Data

US 2018/0218344 A1    Aug. 2, 2018

Related U.S. Application Data

(60) Provisional application No. 62/435,277, filed on Feb. 1, 2017.

(51) Int. Cl.
| | |
|---|---|
| *G06Q 20/10* | (2012.01) |
| *G06Q 30/04* | (2012.01) |
| *G06Q 20/36* | (2012.01) |
| *G06Q 20/32* | (2012.01) |
| *G06Q 20/04* | (2012.01) |

(52) U.S. Cl.
CPC ......... *G06Q 20/102* (2013.01); *G06Q 20/047* (2020.05); *G06Q 20/3221* (2013.01); *G06Q 20/367* (2013.01); *G06Q 30/04* (2013.01)

(58) Field of Classification Search
CPC . G06Q 20/102; G06Q 20/047; G06Q 20/3221
USPC .......................................................... 705/39
See application file for complete search history.

(56) References Cited

U.S. PATENT DOCUMENTS

| | | | |
|---|---|---|---|
| 10,460,312 B1* | 10/2019 | Kurani ................. | H04M 17/10 |
| 2005/0060261 A1* | 3/2005 | Remington ............ | G06Q 20/10 |
| | | | 705/40 |
| 2016/0071074 A1* | 3/2016 | Baird .................... | G06Q 20/14 |
| | | | 705/40 |
| 2016/0132846 A1* | 5/2016 | Liu ........................ | G06Q 20/42 |
| | | | 705/39 |
| 2019/0050853 A1* | 2/2019 | Kumar ................. | G06Q 20/405 |

* cited by examiner

*Primary Examiner* — Jessica Lemieux
(74) *Attorney, Agent, or Firm* — Hunton Andrews Kurth LLP

(57) ABSTRACT

The invention relates to a computer-implemented system and method for receiving at a business an electronic person to business (P2B) payment from an individual. The method may comprise the steps of contacting an individual having a demand deposit account (DDA) to request the P2B payment in an amount that is due to the business; providing a designated electronic address for the business for receiving the P2B payment; identifying a reference number that is associated with the P2B payment; requesting the individual to use a P2B payment server to make the P2B payment from the individual's DDA account to the designated electronic address, wherein the P2B payment is associated with the reference number; monitoring the P2B payment server in real time to confirm receipt of the P2B payment; and using the reference number to apply the received P2B payment to the amount that is due to the business.

12 Claims, 5 Drawing Sheets

PERSON TO BUSINESS PAYMENT SYSTEM AND METHOD

RELATED APPLICATIONS

This application claims priority to U.S. Application No. 62/453,277, filed Feb. 1, 2017, entitled "Person to Business Payment System and Method," which is hereby incorporated by reference.

FIELD OF THE INVENTION

The invention relates generally to a system and method for facilitating person to business (P2B) payment transactions, and more particularly to a system and method for enabling a business to receive a payment from a person in real time or near real time.

BACKGROUND

Banks, credit unions, and other financial institutions regularly encounter situations in which their customers are delinquent on their payment obligations, such as their monthly mortgage, credit card, student loan, or automobile loan payments. Personnel in the collections department are then called upon to contact the customer to make arrangements for payment of some or all of the past due amount. In these circumstances, the collections agent typically does not accept debit cards or credit cards as a form of payment, but rather asks the customer for his or her checking account or other demand deposit account (DDA) information in order to initiate an automated clearing house (ACH) payment. This approach for collecting past due amounts, however, has some drawbacks. For example, obtaining the correct account number from the customer over the phone is prone to errors because the length and location of these numbers on a check is not standardized. Furthermore, the collections agent typically has no way to verify in real time (e.g., while on the phone with the customer) the accuracy of the information given by the customer, such as the correct account number or the sufficiency of funds in the customer's DDA account. Hence, the collections agent may find out the next day after the ACH payment fails that the account number was incorrect or the customer's account had insufficient funds. And even if the customer had sufficient funds in the account at the time of the phone call, those funds are not reserved for payment to the collections agent. Hence, the customer may withdraw funds before the ACH payment to the collections agent is initiated. Another disadvantage of known collection methods is the processing cost. For example, if the customer chooses to mail a check, the financial institution loses the float time in the mail and incurs additional costs for processing the paper check. Hence, there are a number of disadvantages in known collection methods, including surety of payment and processing costs.

SUMMARY

According to one embodiment, the invention relates to a computer-implemented system and method for receiving a person to business (P2B) payment from an individual. The method may be conducted on a computer system comprising one or more computer processors, mobile devices, electronic storage devices, and networks. The method may comprise the steps of: contacting an individual having a demand deposit account (DDA) to request the P2B payment in an amount that is due to the business; providing a designated electronic address for the business for receiving the P2B payment; identifying a reference number that is associated with the P2B payment; requesting the individual to use a P2B payment server to make the P2B payment to the designated electronic address for the business from the individual's DDA account in the amount that is due, wherein the P2B payment is associated with the reference number; electronically receiving the P2B payment with the reference number; electronically monitoring the P2B payment server in real time to confirm receipt of the P2B payment; and using the reference number to apply the received P2B payment to the amount that is due to the business.

The invention also relates to a computer implemented system for receiving a person to business (P2B) payment from an individual, and software stored on a computer storage device for receiving a person to business (P2B) payment from an individual.

The computer implemented system and method described herein can provide the advantage of enabling a business to receive a payment from an individual in real time including a reference number that allows the business to apply the payment to the correct account, according to various embodiments of the invention. The system and method can also reduce processing costs over known collection methods because it does not involve processing a paper check or using another transaction method (e.g., debit card transaction) that has relatively high transaction costs. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENTS

Figure 1:
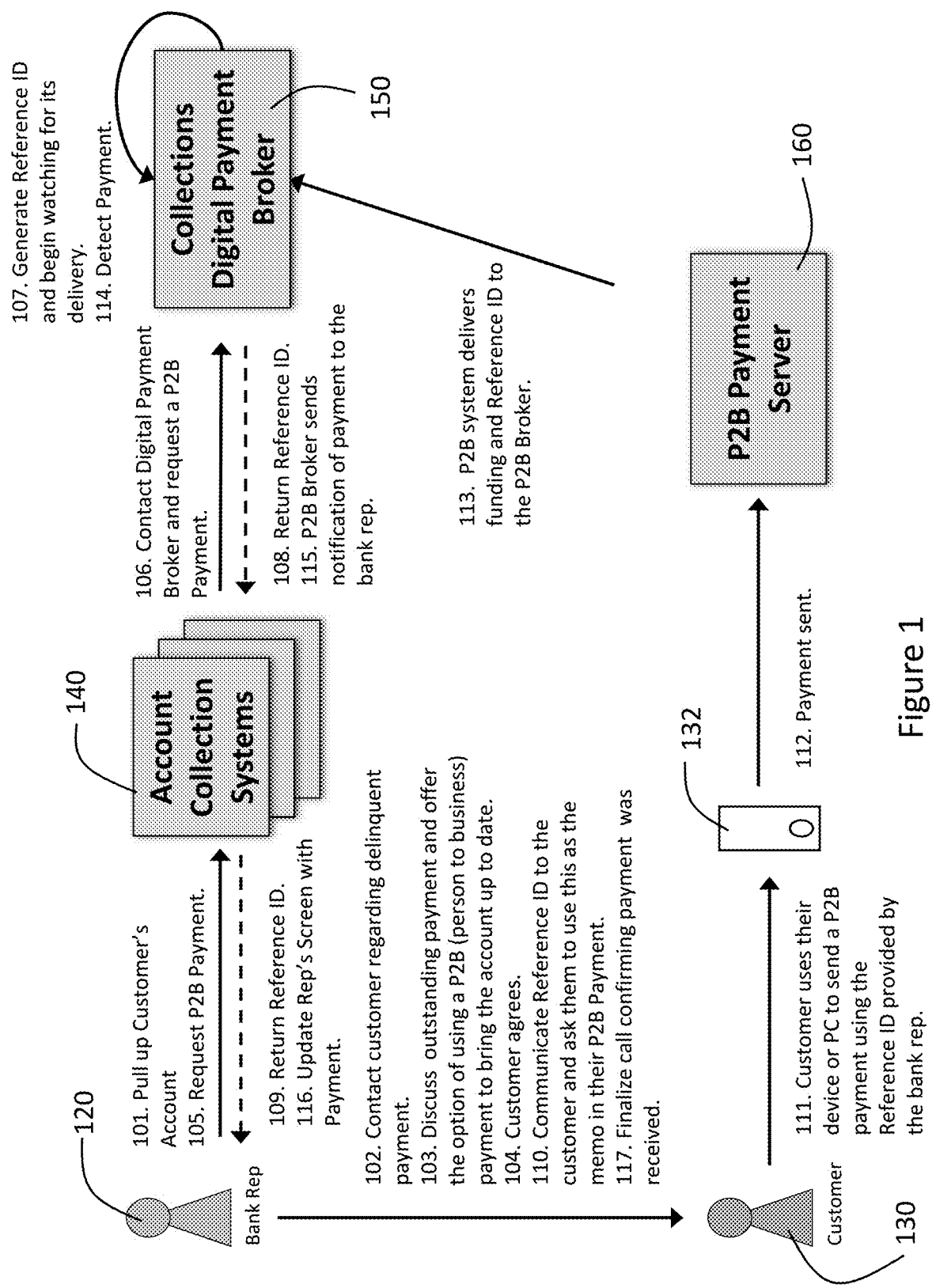
FIG. 1 is flow diagram of a method for consumer-initiated P2B collections payments according to an exemplary embodiment of the invention.

An example of a person to business (P2B) payment system and method will now be described in order to illustrate various features of the invention. The P2B payment system may be designed to utilize some of the existing functionality of a person to person (P2P) payment system such as Chase QuickPay or Zelle but to also provide additional functionalities such as enabling a business to receive payments from an individual using a consumer-initiated or bank-initiated process, the use of tokens for digital collections payment processing, an in store checkout process using a P2B payment, a P2B collect on delivery (COD) payment process, and enabling an individual to specify a reference number, such as a remittance number or a dynamically-generated number or code (including barcodes and quick response (QR) codes), so that the business receiving the payment can identify the payment and apply it to the proper account at the business.

According to an exemplary embodiment of the invention, the P2B payment system allows an individual to send money electronically with his or her computer or mobile device to a recipient such as a business or a person. Initially, the individual may choose to enroll in the P2B payment system and establish an account, as the system may also provide P2P functionality enabling the individual to send money to other people. To enroll, the individual may visit a P2B web page that provides enrollment instructions. For example, the individual may be a DDA account holder at a bank and the bank may provide a web page with instructions for enrolling in the P2B program. If the individual does not already have a username and password for online banking at the bank, the individual may be instructed to choose a username and password for the P2B payment system. The individual may also be prompted to identify a preferred email address for communications with the P2B payment system.

Next, the individual may be required to identify one or more DDA accounts at the bank that will be used as a source DDA account from which the individual can make payments using the P2B payment system. The DDA account may be identified by account number, routing number, and/or other identifying information, for example. The individual may then be invited to identify other people with whom the individual may send and receive payments using the P2B payment system. The other people can be identified by an email address, mobile phone number, or other electronic address, for example. At the time of enrollment in the P2B payment system, the individual may not need to identify any business as a potential recipient of payments, but the individual can add contact information for businesses later as the need arises.

Once the individual has enrolled in the P2B payment system, the P2B payment system offers the convenience of being able to send money electronically to a business or to another person by following a few steps. The individual authenticates to his or her account (e.g., via log in, pin, or biometric authentication), elects to make a P2B payment, enters the payment amount and payment date, and enters and/or selects a recipient (via a list of pre-defined individuals or businesses or by entering contact information for a new recipient).

In the case of a person to business payment, according to one example, the individual may enter an email address provided by a collections agent (e.g., collections@bank.com) that has been established for receiving P2B payments from customers with past-due accounts. Similar email addresses and processes can be established to receive P2B payments for past due mortgage loans, student loans, automobile loans, and credit card balances, for example, where the account is due or overdue but has not yet gone to the collections department.

The individual may also be requested to enter a remittance number or other type of reference number in connection with the P2B payment. The reference number can be used by the business to identify the payment and to apply the payment to the proper account. For example, if the individual has an overdue balance of $2,000 on his or her automobile loan with the bank, the collections agent may request that the individual enter the account number for the automobile loan as the reference number when the individual makes the payment using the P2B payment system. In this way, the bank can identify the payment being made and apply it to the outstanding balance of the individual's automobile loan.

The reference number entered or identified by the individual can take other forms as well. For example, it may be a remittance number for an individual invoice or monthly statement (rather than an account number), or it may be a unique number generated in real time by the business for the purpose of collecting an outstanding balance.

In many cases, the individual will have established a P2B account prior to being contacted by the collections agent. However, because the enrollment process for the P2B payment system may be completed in a few minutes, it is also possible for a collections agent to recommend that an individual enroll in the P2B payment system while talking to the collections agent. The additional time needed to complete the enrollment process will normally justify the surety of payment provided by the P2B payment system.

Once the individual has specified the payment amount, the source account, the recipient's address, and the reference number, the individual can then take an action such as hitting a "send payment" button on his or her mobile phone to trigger or initiate sending of the payment to the business.

The P2B payment system allows the collections agent to monitor the payment in real time and to verify that it has been made while on the phone with the individual. In particular, when the individual hits "send payment" to send the payment, it is a matter of seconds before the collections agent receives the email confirming that payment has been made. The P2B payment system is configured so that the funds paid by the individual to the business are reserved for the payment at the time the individual makes the payment (subtracted from the individual's available balance), even if settlement occurs later in time. In this way, the business receiving the payment can confirm that the individual did in fact have sufficient funds and that the payment has been made before ending the phone call with the individual.

FIG. 1 is flow diagram of a consumer-initiated P2B collections payment process according to an exemplary embodiment of the invention. As shown in FIG. 1, the process starts in step 101 with the bank representative ("bank rep") 120 retrieving the customer's account information. The customer 130, for example, may be overdue on his or her monthly automobile loan payments owed to the bank, and the bank rep may be responsible for contacting delinquent customers to collect outstanding amounts due. The bank rep may use a personal computing device such as a laptop computer, desktop computer, tablet computer or mobile phone to log into the bank's account collection system 140, which may comprise software and data stored on a dedicated server. As shown in FIG. 1, the bank may maintain a number of account collection systems corresponding to different lines of business. After retrieving the customer's account information, the bank rep contacts the customer, e.g., by telephone, in step 102. In step 103, the bank rep discusses the overdue amount owed by the customer and offers the customer the option of using a P2B payment to bring the customer's account up to date. In step 104, the customer agrees.

The bank rep 120 then uses the account collection system 140 to request a P2B payment in step 105. The bank rep identifies the customer and the account and makes the request for the P2B payment using the account collection system 140. In step 106, the account collection system contacts a collections digital payment broker 150. The collections digital payment broker 150 may comprise a server including software and data, operated by the bank, that provides a number of functions to serve as an automated broker between the bank's account collection systems 140 and a P2B payment server 160. The collections digital payment broker 150 is controlled by the bank and provides an automated interface between the P2B payment server 160 and account collection systems 140. The collections digital payment broker may be comprised of one or more servers, software including bots, and data. In this embodiment, the collections digital payment broker 150 is responsible for (a) generating a unique, transaction-specific reference ID for each anticipated payment, (b) detecting P2B payments from the P2B payment server 160, and (c) notifying the account collection system 140.

The P2B payment server 160 may be a system that provides P2B services comprising one or more servers, software and data. For example, the P2B payment server 160 may provide a P2P service such as Chase QuickPay or Zelle that has been upgraded to provide the P2B functionality as described herein.

Once the collections digital payment broker 150 receives the request from the account collection system 140 for a P2B payment, in step 107 it generates a transaction-specific reference ID and begins a process of monitoring the P2B payment server 160 to determine whether the P2B payment server 160 has returned the reference ID to the collections digital payment broker 150 along with the corresponding payment. In step 108, the collections digital payment broker 150 returns the reference ID that it generated to the account collection system, which in turn transmits the reference ID to the bank rep 120 in step 109.

The P2B payment server 160 may reside on one or more servers owned and operated by the bank, e.g., Chase's QuickPay system. In this case, the customer 130 would be making a payment from their DDA account at the bank to pay overdue amounts on another account at the bank, such as an overdue automobile loan. According to another embodiment, the P2B payment server 160 may be a P2B clearing house such as the Zelle system modified to include the P2B functionalities described herein. According to a further embodiment, the P2B payment server 160 may be a system provided by a third party bank. In this situation, the customer would be using his or her DDA account at one bank to make a P2B payment to satisfy an overdue amount on an account at another bank.

In step 110, the bank rep communicates the reference ID to the customer. The bank rep may read the reference ID to the customer over the phone, for example. The bank rep may ask the customer to enter the reference ID into a particular field in the customer's P2B payment app, e.g., a reference or memo field.

The customer may make the P2B payment in step 111 using a personal computing device 132 such as a desktop computer, laptop computer, tablet computer, or mobile phone, for example. According to one embodiment, the customer uses a P2B software application ("app") on his or her mobile phone 132 to enter the necessary information for the P2B payment, such as an email address for the recipient (e.g., collections@bank.com), a source DDA account for the payment, and the payment amount. The customer 130 also enters the reference ID received from the bank rep 120 into the appropriate data field in the app. Once the required information has been entered, the customer can hit a "send payment" button to send the payment.

The customer can use other types of personal computing device, such as a laptop computer or desktop computer, to accomplish the same result by visiting an online web page of the P2B provider and providing the required information for the P2B payment. Once the information has been entered, the customer can hit a "send payment" button on the web page to execute the payment through the P2B system.

In step 113, the P2B payment server 160 transmits the payment and the reference ID to the collections digital payment broker 150. The collections digital payment broker detects the payment in step 114 and in step 115 sends notification of the payment, including the reference ID, to the bank rep via the account collection system 140. In step 116, the account collection system updates the bank rep's computer screen indicating that the payment has been made. This allows the bank rep to finalize the call with the customer in step 117 confirming that the payment has been received.

The foregoing method of a consumer-initiated P2B collections payment can provide the advantage of increased surety of payment, since the bank rep can confirm receipt of the payment shortly after the customer makes the P2B payment via the P2B payment server 160. This is a significant improvement even over next day ACH, which may suffer from various problems such as an incorrect account number or lack of available funds. The P2B collections method described herein also provides the advantage of reduced transaction expense as compared to using a debit card. As will be understood from the foregoing description, the bank rep can maintain a conversation with the customer during the entire payment process and can also track the customer's payment to the correct account, since it is associated with the reference ID generated by the collections digital payment broker 150.

The various servers and personal computing devices descried above with respect to FIG. 1 can be linked through various networks. The networks may comprise one or more of the Internet, a wide area network (WAN), a local area network (LAN), and/or an intranet, for example.

Figure 2:
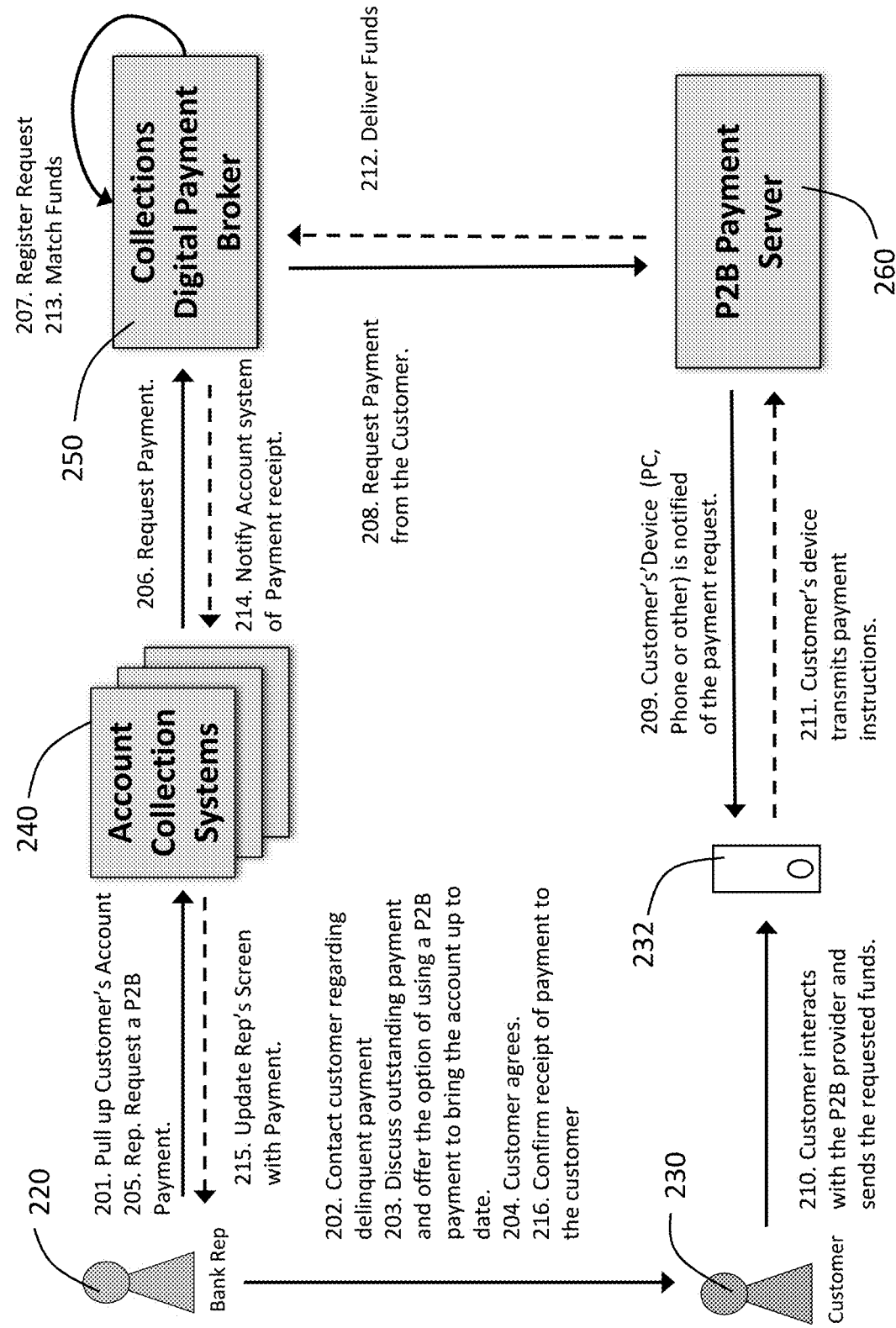
FIG. 2 is a flow diagram of a method for bank-initiated P2B collections payments according to an exemplary embodiment of the invention.

FIG. 2 illustrates a flow diagram of a bank-initiated P2B collections payment process according to another embodiment of the invention. In this example, while the bank rep is taking with the customer on the phone, the bank rep initiates a process to cause the P2B system to send a payment request to the customer's personal computing device.

Referring to FIG. 2, the process starts with the bank rep 220 retrieving the customer's account information in step 201. The bank rep then contacts the customer 230 regarding the delinquent payment in step 202, offers the customer the option of using a P2B payment to bring the account up to date in step 203, and reaches agreement in step 204. The bank rep uses the account collection system 240 to request a P2B payment in step 205, which is then relayed in step 206 by the account collection system 240 to the collections digital payment broker 250.

The collections digital payment broker 250 registers the request in step 207. The registration of the request involves storing the pertinent information in the collections digital payment broker 250 such as the customer name, contact information, account number, requested payment amount, and a reference ID. This enables the collections digital payment broker 250 to match funding that is subsequently received with the stored registration. The collections digital payment broker then transmits to the P2B payment server 260 a request for a P2B payment by the customer in step 208.

The P2B payment server 260, which may be a system operated by the bank, by another bank, or by a third party P2B provider, receives the request from the collections digital payment broker 250 and sends a corresponding request in step 209 to the customer's personal computing device 232, e.g., mobile phone, tablet computer, laptop computer, or desktop computer. The foregoing process from step 205 to step 209 preferably takes place in a few seconds so that the customer 230 receives the P2B payment request on his or her personal computing device while talking with the bank rep. For example, the bank rep may tell the customer that the bank rep has initiated the P2B payment request and that request should appear on the customer's mobile device 232 momentarily so the customer is expecting it. The request from the P2B payment server 260 may present the pertinent information to the customer such as the payment amount, the customer's source DDA account, the recipient, and a "send payment" button.

In step 210, the customer reviews the payment request received from the P2B payment server 260 and if it is acceptable, the customer hits the "send payment" button to make the payment. In step 211, the customer's device 232 sends the payment instructions to the P2B payment server 260 which in turn delivers the funds to the collections digital payment broker 250 in step 212.

The collections digital payment broker receives the funds transmission from the P2B payment server 260 and compares it to registrations that have been stored previously in step 207. For example, the collections digital payment broker 250 may match the received funds with a previously stored registration using the customer name, account number, payment amount and/or reference ID. Once the funds have been matched to the registration, the collections digital payment broker 250 sends an electronic notification of the payment to the account collection system 240 in step 214 which updates the bank rep's screen in step 215 to show that the payment has been received. The bank rep 220 can then inform the customer 230 who is still on the phone in step 216 that the payment has been received. The process in FIG. 2 can provide the advantages of surety of payment since the bank rep confirms receipt while the customer is still on the phone, as well as reduced transaction costs (e.g., compared to a debit card transaction).

Figure 3:
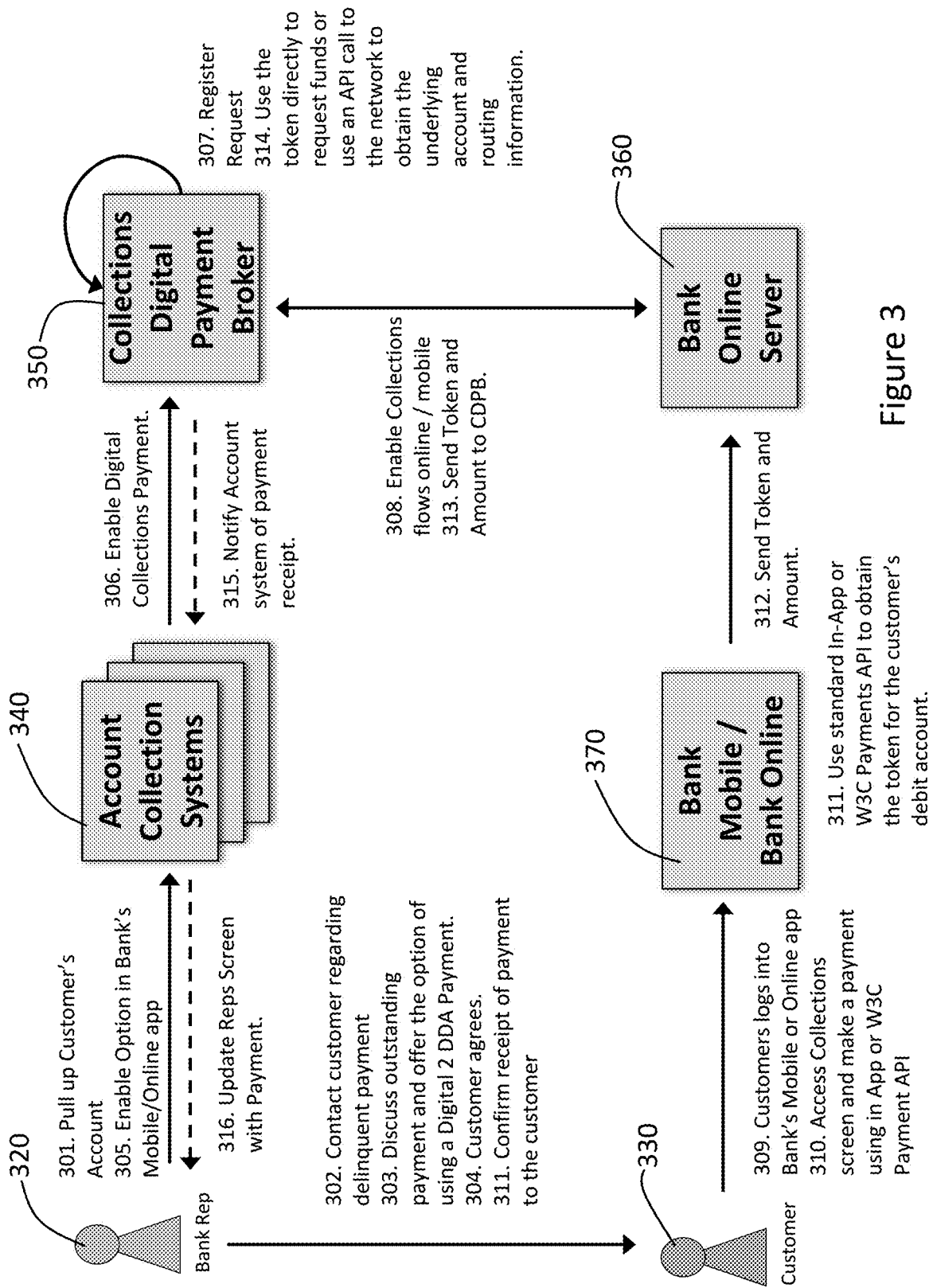
FIG. 3 is a flow diagram of a method for digital collections payment processing using a token according to an exemplary embodiment of the invention.

FIG. 3 illustrates another embodiment of the invention in which tokens are used to process digital collections payments. In this embodiment, the customer uses an app such as Apple Pay on his or her mobile device, or a payment API such as the W3C request payment API with an online banking website, to generate a token. The token can be used to access the customer's account. The token has an expiration date and time to ensure that it remains active only for a predetermined time period.

The process starts in step 301 with the bank rep 320 using the account collection system 340 to retrieve the customer's account information, including the overdue amount. The bank rep 320 contacts the customer 330, e.g., by phone, regarding a delinquency payment in step 302, and offers the customer in step 303 the option of using a digital to DDA payment to bring the account up to date. The customer agrees in step 304.

In step 305, the bank rep uses the account collection system 340 to enable the digital collections payment option in the customer's mobile or online account at the bank. The account collection system in step 306 in turn transmits a message to the collections digital payment broker 350 that enables the digital collections payment option and that contains the pertinent data identifying the customer, account, and payment amount. The collections digital payment broker in step 307 registers the payment request so that it can be later matched to a payment that is received.

In step 308, the collections digital payment broker transmits a message to the bank online server (providing online banking services) 360 that enables the digital collections payment option. The bank online server 360 includes functionality to request a payment from the customer and to receive payment, similar to an online merchant.

In step 309, while still on the phone with the bank rep, the customer logs into his or her mobile banking app or online banking web page. Because the digital collections payment option has been enabled by the bank rep, in step 310 the customer can access a collections screen and make a payment using the mobile banking app or the online banking web page. The mobile app may generate a token and expiration time. For example, the customer may log into Apple Pay and select a particular debit card that is stored in Apple Pay. The Apple Pay payment sheet appears on the customer's mobile device, and the customer selects a card (e.g., a debit card), enters contact information for the recipient, and enters a payment amount. When the customer hits the "send payment" button, the app generates a token in step 311 that enables subsequent access to the customer's debit card account. For example, the token can be generated by Apple Pay to enable access to a debit card stored in Apple Pay.

According to another example, the customer uses a laptop computer to log in to the bank's online banking web page. Because the digital collections payment option has been enabled by the bank rep, in step 310 the customer can access a collections screen and make a payment by selecting a source account (e.g., a DDA account), entering a recipient address, and entering a payment amount. When the customer hits the "send payment" button, the online banking web site uses the W3C request payment API to generate a token in step 311 that can be used subsequently to access the customer's DDA account.

In step 312, the mobile app or the online web site sends the token and the payment amount to the bank online server 360. The bank online server in turn sends the token and payment amount to the collections digital payment broker 350 in step 313. According to one embodiment, in step 314 the collections digital payment broker 350 uses the token to directly request funding of the payment amount specified by the customer. According to another embodiment, in step 314 the collections digital payment broker 350 uses the token and an API to request the account number and routing number of the customer's DDA, which is then used to obtain funding of the payment amount specified by the customer from the account selected by the customer.

In step 315, the collections digital payment broker 350 sends a message notifying the account collection system 340 that payment has been received. The account collection system updates the bank rep's screen in step 316 to reflect receipt of the payment. The bank rep can then inform the customer that the bank rep has received the customer's payment and end the call.

Figure 4:
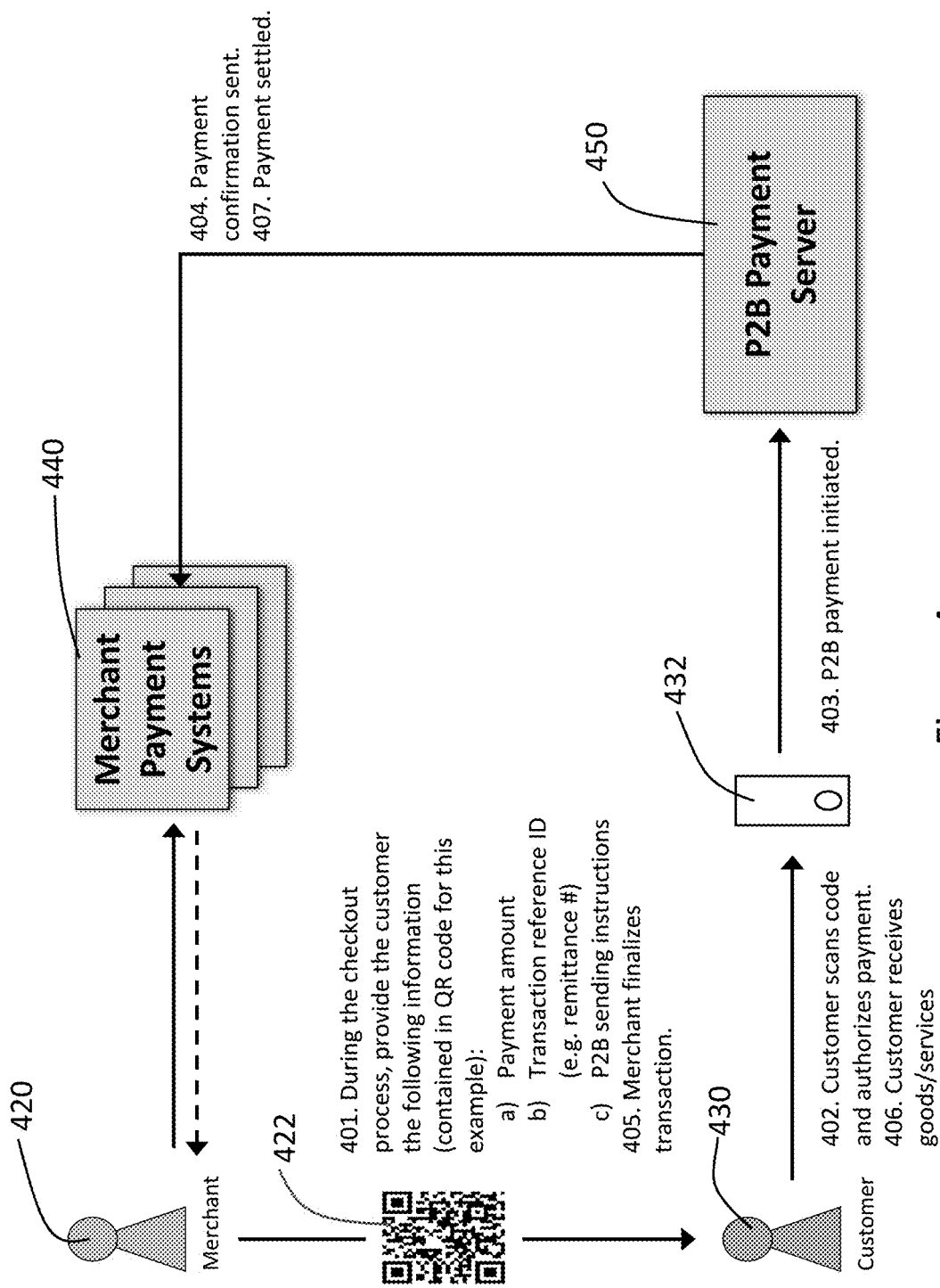
FIG. 4 is a flow diagram of a method for making a P2B checkout payment according to an exemplary embodiment of the invention.

According to another embodiment, the invention can be used for real time in store payments. As shown in FIG. 4, during the checkout process, a reference number or code (e.g. barcode, QR code or other machine-readable code) can be dynamically generated by the store clerk and provided to the individual payor including a designated email address, phone number, or other contact information or electronic address of the store. For example, as shown in step 401, the merchant 420 can generate a QR code 422 that encodes the payment amount a transaction reference ID such as a remittance number, and P2B sending instructions. The P2B sending instructions may include an email address, phone number, or other electronic address of the recipient, for example. The customer 430 uses the reference number and designated email address along with the payment amount and source DDA account encoded in the QR code, to pay the merchant using the P2B payment server 450. For example, the customer 430 can scan the QR code 422 in step 402 using his or her mobile phone 432 to obtain the foregoing information. The customer's mobile device 432 can present the payment amount and payment recipient to the customer, enabling the customer to verify the transaction details and authorize payment.

In step 403, the customer initiates a P2B payment which is transmitted to the P2B payment server 450. The P2B payment server 450 then sends a payment confirmation to the merchant payment system 440 in step 404. In step 405, the merchant finalizes the transaction after receiving confirmation that the payment has been received. In step 406, the customer receives the goods or services that he or she purchased. The payment is settled between the P2B payment server 450 and the merchant payment system 440 in step 407. Benefits to the merchant include faster (or equal to all other next day payments) and cheaper payment (versus check processing or plastic card payment on VISA, MasterCard or Amex). The individual consumer also benefits, as account information is not transmitted to the payee (no DDA account number, no credit/debit card number), which enhances security.

According to another embodiment of the invention, the P2B system can be used as an alternative for cash on delivery (COD) payments. For example, if a business or other organization takes numerous checks upon delivery of its goods to its customers, there are opportunities for checks to be lost and the availability of the funds is also delayed due to "desk float" (increased float due to human delay of the deposit). One particular example might be sales of Boy Scouts Popcorn which involves a large group of inexperienced collectors (Boy Scouts) obtaining payment for goods and which may result in checks being made out to a recipient such as "Pack 210."

Figure 5:
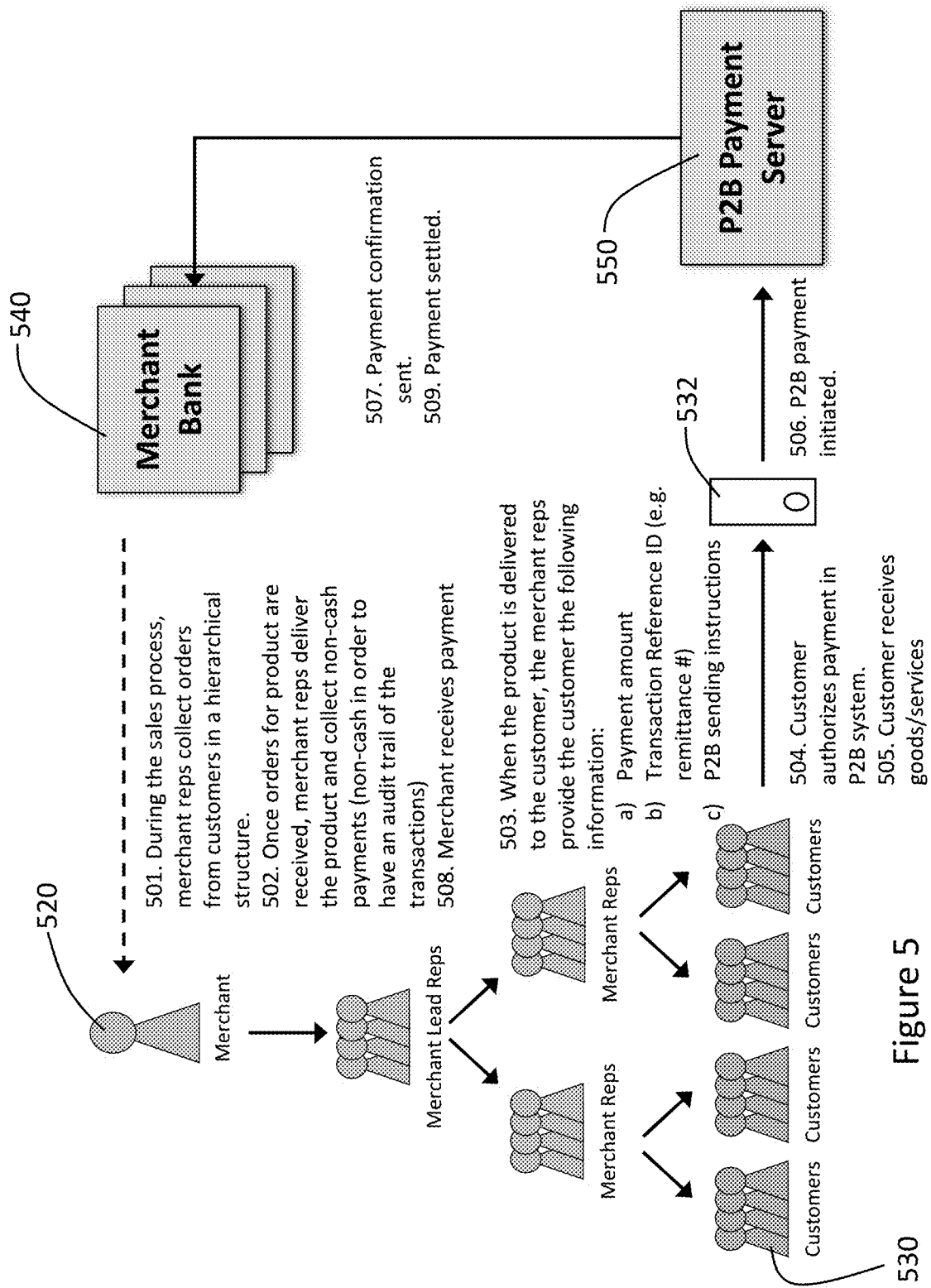
FIG. 5 is a flow diagram of a method for making P2B collect on delivery (COD) payments according to an exemplary embodiment of the invention.

FIG. 5 illustrates an example of a process for making P2B COD payments. In step 501, during the sales process merchant representatives ("merchant reps") collect orders from customers in a hierarchical structure. Once orders for products are received, in step 502, merchant reps deliver the product and collect non-cash payments. Non-cash payments provide the advantage of having an audit trail of the transactions. In step 503, when the product is delivered to the customer, the merchant reps provide the customer with the payment amount, a transaction reference ID such as a remittance number, and P2B sending instructions, such as a recipient email address.

In step 504, the customer uses his or her mobile phone 532 and P2B app to authorize payment and in step 505 the customer receives the goods or services (e.g., popcorn). The P2B payment is initiated by the P2B app in step 506, which involves transmission of instructions to the P2B payment server 550. The P2B payment server 550 sends a payment confirmation to the merchant bank 540 in step 507. The merchant 520 receives the payment in step 508. The payment is settled in step 509. This embodiment can provide a number of advantages, including reduced float expense (as compared to Visa, Mastercard and Amex networks), increased cash flow, funds availability, payment surety, increased safety due to no customer account information being transmitted to the merchant or merchant reps, and an improved audit trail (which is electronic).

The P2B payment systems described above may include one or more computer servers and networks. The systems enable an individual sender to send money electronically with his or her personal computing device to a business or to another person. The individual's personal computing device may be a mobile device such as an iPhone or Android device, a tablet computer, such as an iPad, a laptop computer, a desktop computer, or other type of personal computing device, for example.

The P2B payment system may be provided by a financial institution such as retail bank, according to one embodiment of the invention. The P2B payment system may be embodied in one or more servers operated by the bank that interface with a number of other servers via one or more networks. The P2B system may also interface with third party systems. According to one embodiment, the third party P2B payment server may be owned and/or operated by a consortium that provides P2B and P2P clearing house services between multiple banks to allow a customer of one bank to make P2B or P2P payments to a customer of another bank. The third party P2B payment server may comprise functionality for sending P2P payments between individual customers at different banks (e.g., the functionality provided by the Zelle platform) as well as the functionality described above for sending P2B payments to a business.

The various servers and personal computing devices may be connected via networks that enable communications between various computing devices in the system. The networks may comprise one or more of the Internet, a wide area network (WAN), a local area network (LAN), and/or an intranet, according to various embodiments of the invention.

According to other embodiments of the invention, the individual can make a payment to a business that is not a financial institution. For example, a furniture store that provides its own financing may encounter situations where its customers are delinquent on their payments. A collections agent retained by the furniture store can call the delinquent customer and request payment via the P2B system. The collections agent can follow a similar process to that described above by providing the individual with a reference number and an email address (e.g., collections@furniturestore.com). The reference number may be an invoice number, a customer account number, or a unique reference number generated on the fly that allows the collections agent to match the payment made with the P2B system to the delinquent customer account.

While the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers described above may be stored and cataloged in one or more databases, which may comprise or interface with a searchable database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications networks may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications networks described above, may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications networks described above may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication network may comprise a satellite communications network, such as a direct broadcast communication system (DBS) having the requisite number of dishes, satellites and transmitter/receiver boxes, for example. The Communications networks may also comprise a telephone communications network, such as the Public Switched Telephone Network (PSTN). In another embodiment, communication networks may comprise a Personal Branch Exchange (PBX), which may further connect to the PSTN.

Exemplary embodiments of the invention may utilize various types of communication devices whereby a user may interact with a network that transmits and delivers data and information used by the various systems and methods described herein. The user communication device may include a microprocessor, a microcontroller or other device operating under programmed control. The user communication device may further include an electronic memory such as a random access memory (RAM) or electronically programmable read only memory (EPROM), a storage (which is typically non-transitory) such as a hard drive, a CDROM or a rewritable CDROM or another magnetic, optical or other media, and other associated components connected over an electronic bus, as will be appreciated by persons skilled in the art. The user communication device may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The user communication device may also include a network-enabled appliance, a browser-equipped or other network-enabled cellular telephone, or another TCP/IP client or other device.

As described above, the system may comprise or interface with a number of servers and user communication devices, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, or simply software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers described above may include software or computer programs stored in the memory (non-transitory computer readable medium containing program code instructions executed by the processor) for executing the methods described herein. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example.

Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen for example. A user interface may also include any of a mouse, touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface is any device that provides communication between a user and a processor. The information provided by the user to the processor through the user interface may be in the form of a command, a selection of data, or some other input, for example.

As discussed above, a user interface is utilized by the processor that performs a set of instructions such that the processor processes data for a user. The user interface is typically used by the processor for interacting with a user either to convey information or receive information from the user. However, it should be appreciated that in accordance with some embodiments of the invention, it is not necessary that a human user actually interact with a user interface used by the processor. Rather, it is contemplated that the user interface of the invention might interact, i.e., convey and receive information, with another processor, rather than a human user.

Although the embodiments of the present invention have been described herein in the context of a particular implementation in a particular environment for a particular purpose, those skilled in the art will recognize that its usefulness is not limited thereto and that the embodiments of the present invention can be beneficially implemented in any number of environments for any number of purposes.

What is claimed is:

1. A computer-implemented method for implementing a direct electronic person to business (P2B) payment comprising:
   generating, by an account collection system implemented on a dedicated server, a person to business (P2B) payment request in an amount that is due to a business by a user, the P2B payment request comprising a designated electronic address for the business to receive the P2B payment and the requested payment amount that is due to the business;
   transmitting the P2B payment request to a digital payment broker, the digital payment broker serving as an automated interface between the account collection system and a P2B payment server;
   generating, by the digital payment broker, a unique reference number specific to the P2B payment request, the unique reference number being generated for each of a plurality of P2B payment requests received by the digital payment broker;
   registering, by the digital payment broker, the P2B payment request, the registering comprising storing, one or more user specific information associated with the P2B payment request, the requested payment amount along with the designated electronic address for the business as specified in the P2B payment request and the unique reference number specifically generated for the P2B payment request, in the digital payment broker;
   transmitting, by the digital payment broker, the P2B payment request along with a copy of the unique reference number, to the P2B payment server, the P2B payment server being communicatively coupled to a mobile device of the user for relaying the P2B payment request and the unique reference number to the user and receiving one or more P2B payment instructions from the user;
   transmitting, electronically, by the P2B payment server, funds corresponding to the requested payment amount along with a reference number corresponding to the copy of the unique reference number, to the digital payment broker;
   identifying, by the digital payment broker, a matching P2B payment request from the plurality of P2B payment requests registered on the digital payment broker, the matching P2B payment request being associated with a unique reference number that match the reference number received from the P2B payment server; and
   notifying, by the digital payment broker, the account collection system of a completion of the P2B payment request.

2. The method of claim 1, wherein the designated electronic address for the business comprises an email address.

3. The method of claim 1, further comprising using, by the digital payment broker, the designated electronic address for the business as a transfer destination for the funds.

4. The method of claim 1, further comprising:
   enabling a collections option in a mobile software application on the user-specific electronic device;
   electronically receiving a token generated with the mobile software application, wherein the token enables access to a Demand Deposit Account (DDA) associated with the user; and
   using the token to obtain the P2B payment from the DDA associated with user.

5. The method of claim 1, further comprising:
   enabling a collections option in an online interface on the user-specific electronic device;
   electronically receiving a token generated with the online interface, wherein the token enables access to the DDA associated with the user; and
   using the token to obtain the P2B payment from the DDA associated with the user.

6. The method of claim 1, further comprising:
   encoding the requested P2B payment amount, the unique reference number, and the designated electronic address for the business to receive the P2B payment of the user into a machine-readable code;

sending the machine-readable code to a mobile device associated with the user;

identifying with the mobile device the requested P2B payment amount due, the reference number, and the designated electronic address for the business from the machine-readable code; and using the requested P2B payment amount due, the unique reference number, and the designated electronic address for the business to initiate the P2B payment using the mobile device.

7. The method of claim 1, wherein:

the business is a merchant;

the user initiates the P2B payment upon receipt of goods delivered by the merchant; and the merchant provides an electronic address associated with a merchant bank that receives the P2B payment on behalf of the merchant.

8. A P2B payment system for facilitating an electronic person to business (P2B) payment the system comprising:

an account collection system implemented on a dedicated server that generates a P2B payment request, in an amount that is due to a business by a user, the P2B payment request comprising a requested payment amount due to the business and a designated electronic address for the business to receive the P2B payment of the user;

a digital payment broker communicatively coupled to the account collection system that registers the P2B payment request received from the account collection system, the registering comprising, generating a unique reference ID for the P2B payment request and storing the unique reference ID along with one or more user specific information associated with the P2B payment request and the requested payment amount specified in the P2B payment request, in the digital payment broker;

a P2B payment server communicatively coupled to the digital payment broker and that receives the P2B payment request along with a copy of the unique reference number from the digital payment broker and electronically transmit funds corresponding to the requested payment amount along with a reference number corresponding to the copy of the unique reference number, to the digital payment broker, the P2B payment server being communicatively coupled to a mobile device of the user for relaying the P2B payment request and the reference number to the user and receiving one or more P2B payment.

9. The system of claim 8, wherein the designated electronic address for the business comprises an email address.

10. The system of claim 8, wherein the digital payment broker is further programmed to:

encode the requested P2B payment amount due, the unique reference number, and the designated electronic address for the business to receive the P2B payment of the user into a machine-readable code; and send the machine-readable code to a the mobile device associated with the user.

11. The method of claim 8, wherein the account collection system comprises an account collection server operated by the business.

12. The method of claim 11, wherein the business comprises a financial institution associated with a Demand Deposit Account (DDA) of the user.

* * * * *